United States Patent [19]

Kühlmann et al.

[11] Patent Number: 4,911,247
[45] Date of Patent: Mar. 27, 1990

[54] POWER CULTIVATING DEVICE

[75] Inventors: Josef Kühlmann, Königstr. 51, D-4419 Laer; Gerd Scheipers, Laer, both of Fed. Rep. of Germany

[73] Assignees: Josef Kühlmann, Laer; Karl Schüer, Rosendahl, both of Fed. Rep. of Germany

[21] Appl. No.: 236,521

[22] PCT Filed: Dec. 19, 1987

[86] PCT No.: PCT/DE87/00601
§ 371 Date: Jul. 15, 1988
§ 102(e) Date: Jul. 15, 1988

[87] PCT Pub. No.: WO88/04884
PCT Pub. Date: Jul. 14, 1988

[30] Foreign Application Priority Data

Dec. 24, 1986 [DE] Fed. Rep. of Germany ....... 8634707
Mar. 30, 1987 [DE] Fed. Rep. of Germany ....... 8704525

[51] Int. Cl.⁴ .......................... A01B 1/06; A01B 39/08; A01B 33/08
[52] U.S. Cl. ...................................... 172/41; 56/17.5; 56/12.7; 56/255; 172/111
[58] Field of Search .................. 30/276; 172/41, 42, 172/111, 43; 56/255, 17.5, 12.7

[56] References Cited

U.S. PATENT DOCUMENTS 2,531,577 11/1950 Dayton .
2,888,084 5/1959 Trecker ................... 172/41
2,897,902 8/1959 Emmons ................. 172/41 X
3,781,991 1/1974 Stretton ................... 30/276
4,213,504 7/1980 Schneider .
4,293,041 10/1981 Holmstadt .
4,364,435 12/1982 Tuggle ..................... 172/41

FOREIGN PATENT DOCUMENTS 1800229 5/1970 Fed. Rep. of Germany .
8526702 4/1986 Fed. Rep. of Germany .
1228900 3/1963 France .
2495529 6/1982 France .
103302 8/1917 United Kingdom .
270302 5/1928 United Kingdom .
450535 7/1936 United Kingdom .
516977 1/1940 United Kingdom .
605940 8/1948 United Kingdom .

Primary Examiner—Richard J. Johnson
Attorney, Agent, or Firm—Peter K. Kontler

[57] ABSTRACT

A power handheld cultivating device has a protective tube for a motor drive shaft and a working implement mountable at the end of the protective tube. A miter-like gear is connectible to the end of the drive shaft and has an output shaft carrying a gear wheel which cooperates with a toothed gear rigid with a drive shaft for the working implement. The implement is mounted on a carrier which is laterally surrounded by an impact body and passages open to the outside may be provided between the impact body and the carrier.

25 Claims, 2 Drawing Sheets

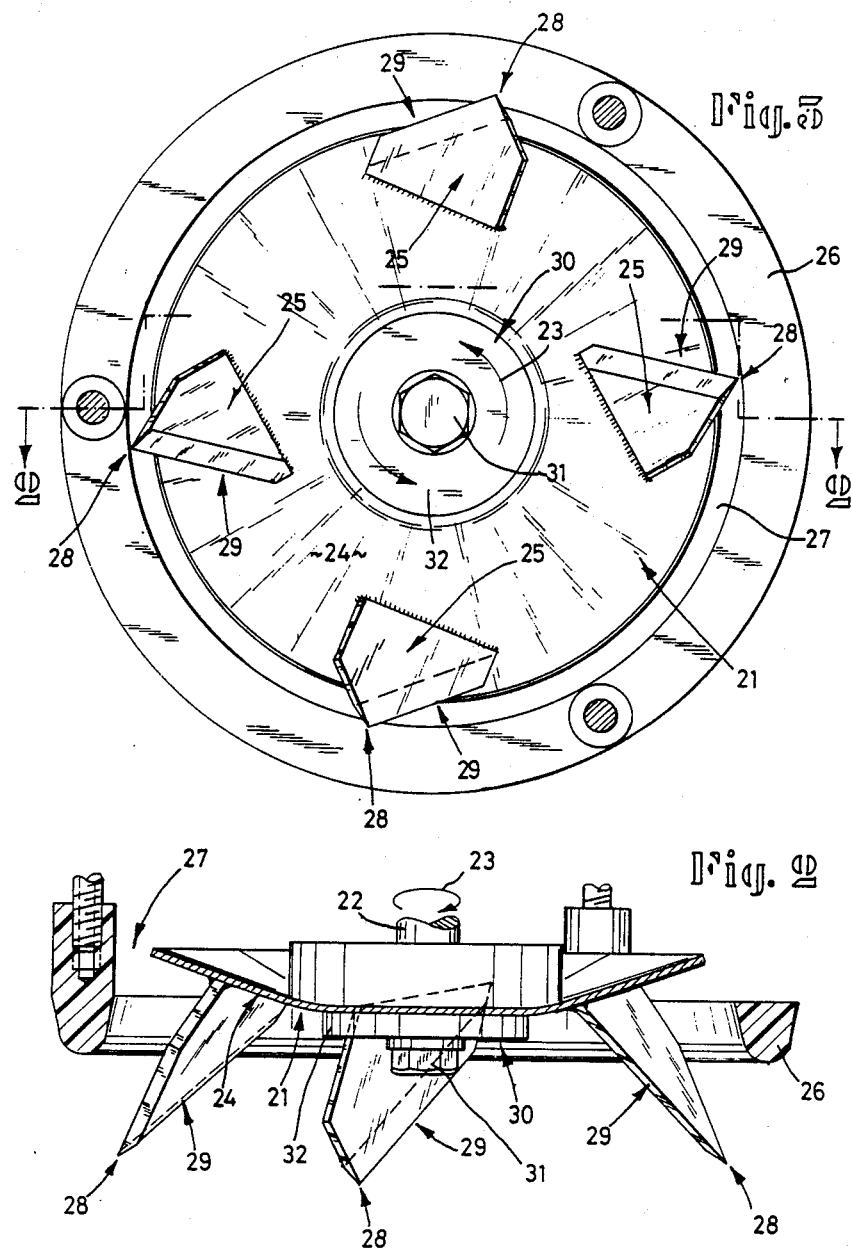

POWER CULTIVATING DEVICE

The invention relates to a handheld power cultivating device.

Such cultivating tools are known (West German Gebrauchsmuster No. 85 26 702) and are used for cultivation in nurseries, small plants, vineyards and the like.

A problem with these known devices is the high rotational speed of the drive motors which cause the actual working implement such as, for example, a hoeing disc, to likewise have a high rotational speed. Such high rotational speeds are not desired in practice.

Attempts to equip the drive motor with a reduction gear have been unsuccessful until now. Thus, the reduction gear in the vicinity of the drive motor results in an unfavorable weight shift of the working implement and, in addition, the rotational moment of the shaft is very large so that it is difficult to stabilize and guide the shaft.

An object of the invention is to provide a handheld cultivating device which is equipped with a reduction gear in such a manner that the handling characteristics of the device are not adversely affected by installation of the reduction gear. The reduction gear is to be easily interchangeable and capable of being incorporated in the structure of the working head.

The invention proposes a handheld cultivating device equipped with a protective tube which is attached to the drive motor from below and guides the drive shaft. A reduction gear can be pushed onto this protective tube and, a shaft connection between the drive shaft and the working implement can thereby be established. Since the reduction gear is arranged at the lower end of the motor shaft, a small rotational moment is generated on the motor shaft and a large rotational moment on the working head so that the effect of the working implement is improved and shaft guidance is simplified.

The reduction gear can simultaneously function as a protective housing for the actual working implement such as, for example, a cultivating disc.

In a known handheld cultivating device, the tool carrier is in the form of an arched, convex disc body having a carrier surface which faces the ground and supports teeth serving as cultivating tools. The teeth are of triangular cross section, taper towards their free ends and are inclined opposite to the direction of rotation of the tool carrier. On the upper side, a protective cap is movably held on the supporting or guiding shaft which supports the tool carrier. Loosened soil and weeds can enter the interior of the protective cap through a gap which is located between the upper side of the tool carrier and the lower edge of the protective cap and enlarges as the cap moves upwards. In this situation, which already occurs after a relatively short operating period, the rotating tool carrier becomes loaded to a significant degree. The device then becomes difficult to manipulate and, in addition, the ground can no longer be adequately cultivated due to an impeded flow of soil as well as a reduced output of the tool carrier. Thus, the device must be stopped after relatively short operating periods in order to free the tool carrier and the cap from material which has penetrated. Furthermore, during operation, weeds wind onto the inclined teeth of the known device which taper in the direction of rotation. This makes additional cleaning work necessary. Overall, the known device is extremely difficult to guide manually, and accordingly difficult to manipulate, when the tool carrier becomes loaded during operation.

Another object of the present invention is to provide a cultivating device of the type outlined above which, easily and with substantially no maintenance, allows the ground to be effectively and carefully cultivated with simultaneous destruction of weeds.

To achieve this object, the cultivating device in accordance with the invention is characterized in that the tool carrier is laterally surrounded by an impact body and that passages opening to the outside are provided between the impact body and the tool carrier. By virtue of the free passages formed between the impact body and the tool carrier, loosened soil and comminuted material can freely travel from the operating region of the cultivating tools to the outside. The impact body which laterally surrounds the tool carrier assures precise guidance of the device, e.g., along beds, trees, objects, fences and the like. A protective cap above the tool carrier can be dispensed with. During operation of the device, the upper side of the rotating tool carrier is free of soil and, hence, is unloaded. The supporting and guiding characteristics of the device according to the invention are thus greatly improved relative to the known device. As a rule, cleaning and maintenance are not required during periods of operation.

The impact body is to be designed and arranged in a structurally simple manner such that it advantageously influences guidance of the bottom of the device. Thus, the impact body can overlap the lateral edges of the tool carrier in a downward direction so that the device is supported on the same during operation with a predetermined working depth. Furthermore, loosened material which is flung upwards is braked by the impact body which also has a positive effect on the handling characteristics of the device.

Advantageous embodiments are described with reference to the accompanying drawings where:

FIG. 2 is a cross-sectional view of an exemplary embodiment of the tool carrier of the device according to the invention with a lateral impact body; and FIG. 3 is a bottom view of the tool carrier shown in FIG. 1.

Figure 1:
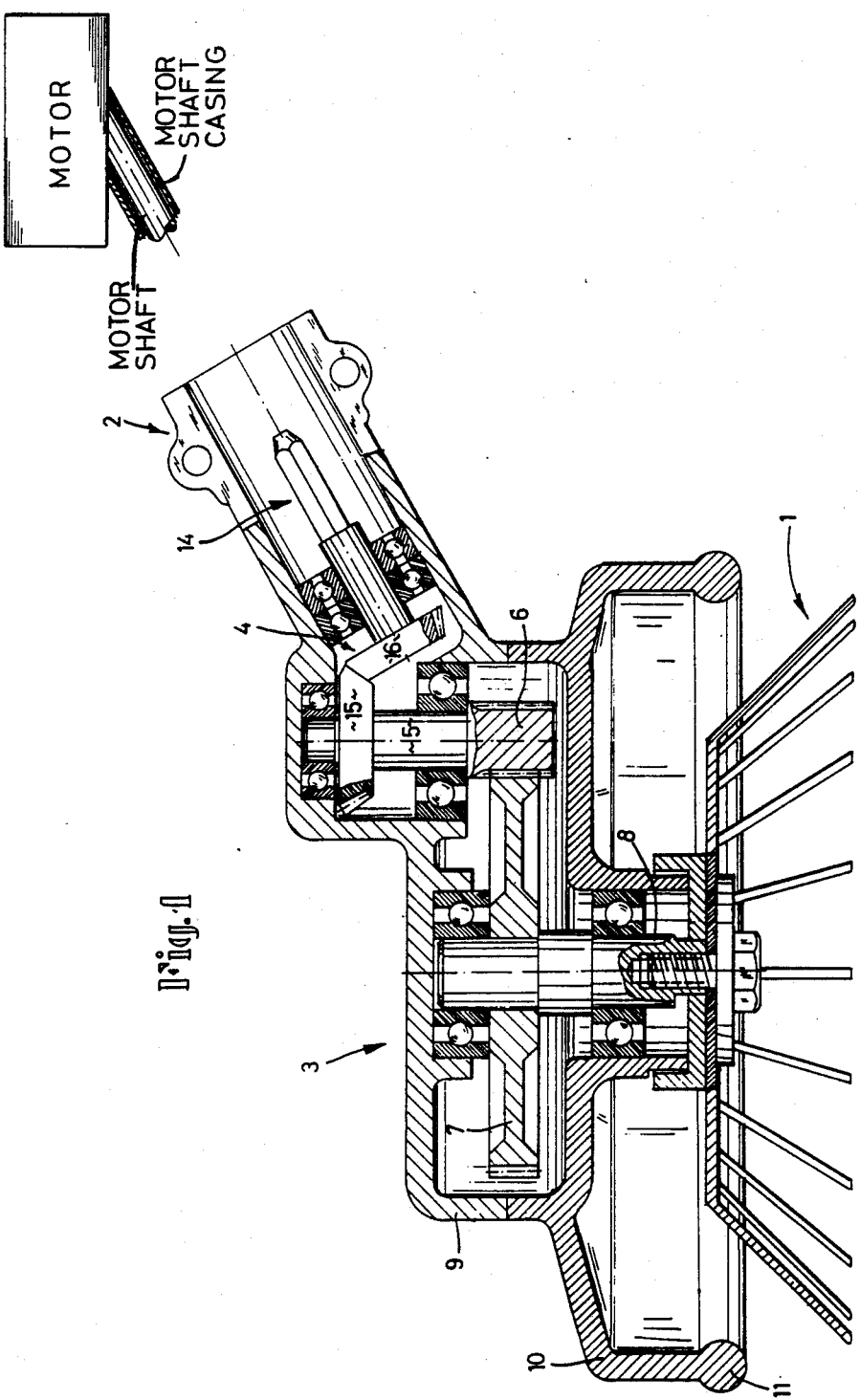
FIG. 1 is a cross section through a reduction gear.

In FIG. 1, a working implement such as, for example, a cultivating disc, is identified by 1 and is arranged at the lower side of a gear housing 3. This gear housing 3 consists of an upper housing part 9 and a lower housing part 10 which are connected to one another by fastening means.

A fastening sleeve 2 capable of being pushed onto the protective tube or meter shaft casing illustrated in the drawing is secured to the upper housing part 9. The output shaft of the drive motor is located inside the protective tube. When the fastening sleeve 2 is pushed onto the protective tube, the output shaft comes into engagement with a shaft connection 14 which leads to a miter gear 4 consisting of the two gear wheels 15 and 16. The gear wheel 15 has an output shaft 5 which carries a gear wheel 6 at its end. The gear wheel 6 meshes with a toothed ear 7 and constitutes the actual main reduction gear. The overall gear ratio may be, for example, 1:7.

A drive shaft 8 for the working implement 1 is connected to the toothed gear 7. This drive shaft 8 and the working implement 1 are securely mounted and guided in the lower housing part 10. A protective ring 11 is formed of one piece with the lower housing part.

The reduction gear described above can be manufactured economically and can be connected to existing cultivating devices in a very simple manner. Moreover, due to its weight, it imparts favorable handling characteristics to the cultivating device.

In FIGS. 2 and 3, the tool carrier of the device for loosening soil and destroying weeds is identified generally by the reference numeral 21 and, in the illustrated exemplary embodiment, is constructed as a convex, arched disc which is set into rotation (arrow 23) via a drive shaft 22. The tool carrier 21 is secured, in a manner not illustrated in detail, to a beveled supporting and guiding shaft which is to be provided with a handle and an electric drive motor at its upper end. The supporting and guiding shaft is advantageously hollow so that the drive transmitting elements of the drive motor can be located inside the shaft.

A total of four cultivating tools 25 are disposed with spacing in the radially outer marginal zone of the lower tool carrier surface 24 which faces the ground during operation. The tool carrier 21 is laterally surrounded by an impact body generally identified at 26. The impact body 26 surrounds the tool carrier 21 with spacing so that passages 27 opening to the outside are formed between the impact body 26 and the tool carrier 21. The impact body 26 is constituted by a ring which overlaps the rotating edge of the tool carrier in a downward direction. In operation, the device is to be guided over the ground on the lower edge of the ring 26 and the cultivating tools 25 are to be guided with a predetermined working depth. Soil material which is conveyed or flung radially outward by the cultivating tools 25 is braked by the impact ring 26 and can travel freely to the outside through the passages 27. The impact body 26 is fixed to the supporting and guiding shaft in a manner not specifically shown but could also be attached to a gear box which is connected to the bottom of the supporting and guiding shaft.

The cultivating tools 25 of the device have vertically inclined longitudinal central planes which, in the direction of rotation 23 of the tool carrier 21, are directed from the inner zone of the tool carrier to the outer zone of the tool carrier. The tapering free bottom ends 28 of the cultivating tools extend below the impact ring 26. The front edge of each cultivating tool 25 in the direction of rotation 23 of the tool carrier 21 is constructed, in the direction of rotation, as a rearwardly beveled cutting edge 29 so that the tools 25 can function as knives. Stalks, weeds and the like are thus cut and cannot wind themselves onto the tools. The inclined cultivating tools 25 which, in the direction of rotation, extend from the inner zone to the outer zone of the tool carrier cause the worked soil to be conveyed from outside to inside. This flow of worked soil material which is directed towards the inner zone of the tool carrier allows the device to be moved through the soil with extremely small forces. The inwardly directed conveying movement effectively assists the manual working movements of the operator. Cultivation can thereby be carried out continuously and easily. Extension of the bottom ends 28 of the cultivating tools 25 underneath the impact ring 26 enables the soil to be worked to the vicinity of the impact edge. Accordingly, the front cutting edges 29 in the direction of rotation of the cultivating tools 25 can effectively break up or cut even long fibrous weeds which are immediately adjacent to plant beds, walls and the like. The front cutting edges can, in addition, be provided with a toothlike cutting profile.

The tools 25 are arranged on two different radii and advantageously also have different lengths.

The carrier surface 24 of the tool carrier 21, which faces the ground, is provided with a bounce attachment which is generally identified by the reference numeral 30 and, in the illustrated exemplary embodiment, is constituted by a disc 32 fixed to the tool carrier 21 by means of a screw connection 31. The bounce attachment 30 likewise contributes to an improvement in the sliding and guiding characteristics of the device in that moving soil materials are braked and stabilized.

We claim:

1. A handheld power device for working the ground, comprising a soil working implement; and drive means for said implement, said drive means including bevel gear means having an input element for connection to a motor and a first output shaft, and reduction gear means having a second output shaft fast with said implement, said bevel gear means comprising one bevel gear which is fast with said input element and another bevel gear which is fast with said first output shaft, and said reduction gear means including a first gear which is fast with said first output shaft and a second gear which is fast with said second output shaft.

2. The device of claim 1, comprising a housing for said bevel gear means and said reduction gear means, said housing being provided with a tubular element for connecting said housing to a tubular case accommodating a drive shaft of the motor.

3. The device of claim 2, wherein said housing includes a first part which accommodates said bevel gear means and said reduction gear means, and a second part which accommodates said second output shaft.

4. The device of claim 3, wherein said first part constitutes an upper part of said housing and said second part constitutes a lower part of said housing.

5. The device of claim 3, wherein said first and second parts are detachable from one another.

6. The device of claim 3, wherein said second part is provided with a protective element.

7. The device of claim 6, wherein said protective element comprises a ring of one piece with said second part.

8. The device of claim 1, wherein said implement comprises a disc-like carrier, and a plurality of spaced soil working tools mounted on said carrier.

9. The device of claim 8, wherein said carrier has a convex surface arranged to face the ground during the working of soil and said tools project from said convex surface.

10. The device of claim 1, wherein said implement comprises a carrier, and at least one soil working tool mounted on said carrier; and further comprising an abutment member which surrounds said carrier.

11. The device of claim 10, wherein said carrier and said abutment member define a free passage between the interior and exterior of said abutment member.

12. The device of claim 10, wherein said carrier has a peripheral edge located within the confines of said abutment member.

13. The device of claim 10, wherein said abutment member has a rounded cross section.

14. The device of claim 10, wherein said abutment member is substantially annular and surrounds said carrier with clearance.

15. The device of claim 10, wherein said carrier is rotatable in a predetermined sense and said one tool extends from an inner zone towards an outer zone of said carrier as considered in the direction of rotation of the latter.

16. The device of claim 10, wherein said one tool is mounted on said carrier such that said one tool is inclined to the vertical during the working of soil.

17. The device of claim 10, wherein said abutment member has a surface arranged to face the ground during the working of soil and said one tool has a soil working end portion substantially in register with said surface.

18. The device of claim 10, wherein said one tool has a soil working knife edge.

19. The device of claim 18, wherein said knife edge is provided with cutting teeth.

20. The device of claim 10, wherein said carrier has a surface arranged to face the ground during the working of soil and said one tool projects from said surface; and further comprising an abutment element in superposition with said surface.

21. The device of claim 20, wherein a plurality of soil working tool project from said surface, said tools being disposed radially outwardly of said abutment element.

22. The device of claim 20, wherein said abutment element is at least approximately conical.

23. The device of claim 20, wherein said abutment element comprises a disc having a convex surface.

24. The device of claim 20, further comprising a screw connection between said abutment element and said carrier.

25. The device of claim 1, wherein said implement comprises a carrier having a center, and a plurality of soil working tools mounted on said carrier at different distances from said center.

* * * * *